United States Patent [19]

Dunstan et al.

[11] Patent Number: 4,947,093
[45] Date of Patent: Aug. 7, 1990

[54] SHOCK RESISTANT WINCHESTER DISK DRIVE

[75] Inventors: Ericson M. Dunstan, Port Hueneme; Dennis Hogg, Simi Valley; John E. Scura, Thousand Oaks; Ming-Goei Sheu, Simi Valley, all of Calif.

[73] Assignee: Micropolis Corporation, Chatsworth, Calif.

[21] Appl. No.: 276,299

[22] Filed: Nov. 25, 1988

[51] Int. Cl.⁵ .......................................... G05B 13/00
[52] U.S. Cl. .................................. 318/560; 318/561; 318/608; 318/632; 360/73.03; 360/73.04
[58] Field of Search .............. 318/500, 561, 599, 592, 318/593, 594, 603, 571, 572, 608, 616, 611, 632; 360/73–78; 388/812, 813

[56] References Cited

U.S. PATENT DOCUMENTS

| | | | |
|---|---|---|---|
| 3,524,332 | 8/1970 | Callies | 464/182 X |
| 3,531,949 | 10/1970 | Downey | 464/182 X |
| 3,886,424 | 5/1975 | Hoshina et al. | 318/630 |
| 3,900,890 | 8/1975 | Eibner | 360/73.04 |
| 3,955,377 | 5/1976 | Bendall | 464/180 X |
| 4,075,667 | 2/1978 | Rose et al. | 360/77.02 |
| 4,135,217 | 1/1979 | Jacques et al. | 360/77.04 |
| 4,236,050 | 11/1980 | Winslow et al. | 360/73.03 X |
| 4,278,925 | 7/1981 | Minakuchi | 388/813 |
| 4,315,199 | 2/1982 | Kyomasu et al. | 318/603 X |
| 4,338,683 | 7/1982 | Furukawa et al. | 360/73.03 X |
| 4,388,713 | 6/1983 | Tatsuguchi | 360/73.03 X |
| 4,536,170 | 8/1985 | Downey | 464/182 X |
| 4,641,070 | 2/1987 | Pfizenmaier et al. | 318/603 X |
| 4,656,577 | 4/1987 | Herman | 101/350 X |
| 4,658,191 | 4/1987 | Okita et al. | 388/812 |
| 4,689,540 | 8/1987 | Tani et al. | 318/608 |
| 4,694,229 | 9/1987 | Cormack | 318/611 X |
| 4,724,370 | 2/1988 | Moraru et al. | 318/632 X |
| 4,759,284 | 7/1988 | Haggard et al. | 101/148 |
| 4,763,205 | 8/1988 | Okano | 360/73.03 X |
| 4,809,606 | 3/1989 | Day et al. | 101/148 |
| 4,825,137 | 4/1989 | Nakajima et al. | 360/73.03 X |
| 4,827,200 | 5/1989 | Ogura et al. | 360/78.06 X |

*Primary Examiner*—William M. Shoop, Jr.
*Assistant Examiner*—Paul Ip
*Attorney, Agent, or Firm*—Poms, Smith, Lande & Rose

[57] ABSTRACT

A shock resistant hard disk drive system employs a plurality of magnetic disks for recording data, a plurality of magnetic heads for performing input/output operation on the magnetic disks, with at least one of the magnetic heads being used as a servo head, a head-positioning mechanism for controlling the movement of the magnetic heads, a servo control mechanism or servo loop for opposing shifts in the location of the servo head, detecting device for detecting and measuring certain accelerations applied to the system, and filtering device for filtering the output of said detecting device and for providing the signal to the head-positioning mechanism. The detecting device detects and measures the magnitude of internal or external accelerations or shocks applied to the system, and provides the necessary signals to counter such accelerations. The pre-existing phase locked loop includes a voltage controlled oscillator, with the voltage control signal applied to the oscillator indicating instantaneous rotational velocity resulting from accelerations applied to the system; and this control signal is modified and applied to servo loop for the head positioner, to hold the head positioner against shifting off track.

21 Claims, 5 Drawing Sheets.

SHOCK RESISTANT WINCHESTER DISK DRIVE

FIELD OF THE INVENTION

This invention relates to an apparatus for providing shock resistance for Rotary Disk Drive Digital Storage Systems.

BACKGROUND OF THE INVENTION

Hard Disk Drive Assemblies (HDA) are sensitive devices that are used by computer systems for magnetically storing and retrieving data. Normally, disk drives are subject to linear and/or rotational, external and/or internal, small and/or large shocks or accelerations. A typical external shock is one produced by the movement of the table on which the computer system rests. A typical internal shock is one generated by the reaction to the motion of the magnetic heads and associated devices during positioning operations. Such internal or external shocks cause the disk drive system to vibrate and may shift the magnetic heads off track. In addition to shifting the magnetic heads off track, certain external shocks could damage the HDA. Therefore, it is desirable to design and install a disk drive shock absorption and protection mechanism to (1) protect the disk drive against potential damage by such shocks, and (2) apply signals to prevent the magnetic heads from being moved off the desired track by such accelerations. At best, these goals have only been partially satisfied by prior art methods. More specifically, the prior art employs certain types of (1) shock-mounts supporting HDA systems to absorb external shocks, and (2) servo control circuitry to detect and subsequently compensate for the shift in the position of the heads resulting from certain shocks.

The shock mounts are normally made of rubber, having a pretermined stiffness. The stiffness of the shock-mounts and such physical characteristics as the weight of the HDA determine the natural frequency of oscillation of the HDA. The stiffer the shock mount, the higher the natural frequency of oscillation of the disk drive. Normally, this natural frequency is less than 1000 Hertz. Unfortunately, however, a shock mount that is too stiff fails to adequately protect the HDA against potential damage by external shocks. Further, if the shock mount is too soft or flexible, it will not adequately resist acceleration or movement caused by reaction to magnetic head repositioning. Accordingly, a compromise is normally selected, with the frequency of oscillation of the assembly and shock mounts being in the order of 100 to 200 Hertz. Regardless of the stiffness of the shock-mounts, higher amplitude shocks will normally cause the HDA to vibrate and move the heads off track. To detect and compensate for such displacement of the heads, servo control circuitry is employed to keep track of the position of the magnetic heads. To gain an understanding of how the servo control circuitry operates, a brief explanation of the operation of a typical disk drive is made below.

A disk drive normally includes, among other elements, a stack of spaced magnetic disks for recording data, a plurality of magnetic heads for performing input-/output operation on the magnetic disks, with at least one of the magnetic heads being used as a servo head, and servo control circuitry for compensating for the shifts in the location of the servo head, and a head-positioning coil for controlling the movement of the heads.

Normally, the magnetic disks include a predetermined number of tracks for recording and retrieving data. Further, a track on a particular disk is normally grouped with the corresponding tracks on the rest of the disks. Such a grouping of the tracks constitutes a logical "cylinder". The tracks that form the logical cylinder are normally parallel with each other, because they are located on disks that are parallel and co-axial with each other. Further, the magnetic heads are stacked parallel to each other and move in parallel. Thus, if a particular magnetic head is located on a particular track in a cylinder, the rest of the magnetic heads will also be located on the corresponding parallel tracks in the cylinder. In this manner, all of the magnetic heads are moved in parallel and simultaneously over their respective tracks.

Therefore, any acceleration that causes one of the magnetic heads to move off the desired track, similarly causes the rest of the magnetic heads to be shifted off their respective desired tracks by the same amount. Thus, by adjusting the position of one of the magnetic heads, all of the magnetic heads will be adjusted simultaneously.

Normally, the particular head that is used for detecting such displacements of the magnetic heads is called a servo head. Further, the circuitry that provides the necessary signal to move the heads back on track is called the servo control circuitry, or servo loop. The servo loop supplies this signal to the head-positioning coil, which applies a corresponding acceleration to the head positioning assembly carrying the magnetic heads.

The servo circuitry uses certain pulses known as servo pulses to detect the displacement of the servo head off its intended track. These servo pulses are recorded on at least one of the magnetic disks. The servo head, which is in parallel with the rest of the magnetic heads, reads the servo pulses and transmits them to the servo circuitry. The servo circuitry uses this data to detect whether the servo head is off track. If the servo head has moved off the desired track, the servo circuitry provides the appropriate signal to the magnetic coil to move the heads back on track. Unfortunately, however, the servo circuitry is only capable of compensating offsets in the position of the servo head resulting from application of certain accelerations. For example, the servo circuitry is not capable of countering the effect of large rotational accelerations in an HDA system that uses a head-positioning assembly that rotates about an axis. In such systems, rotational accelerations normally may cause an error in the input/output operation of the head, and/or a relatively longer delay in the input/output operation.

The capability of the servo circuitry to resist such accelerations applied to the system is also known as the stiffness of the circuit. The stiffer the circuit, the greater is its capability to resist such accelerations. However, the servo circuitry becomes unstable if its stiffness is increased beyond a certain limit. Therefore, when large rotational accelerations are applied to the system, they normally cause a delay and/or error in the input/output operation of the HDA system.

Previous proposals directed to this type of problem include D. W. Rickert U.S. Pat. No. 4,477,755, issued Oct. 16, 1984, and an article entitled "Design Strategies for High-Performance Incremental Servos" by Martyn A. Lewis, Proceedings of the Sixth Annual Symposium on Incremental Motor Control Systems and Devices, May 1977, Department of Electrical Engineering, U. of Ill., Urbana Champagne, Ill. The Rickert patent discloses an electrical model of the mechanical system of a disk drive to respond to internally generated vibrations resulting from certain seek signals, and circuitry to compensate for the expected vibrations. The article discloses the use of "Transducers for External Vibrations" and suggests "measurement of external disturbances and applying these signals (via appropriate networks) to the summing junction so as to cancel the effects of external disturbances." However, the nature of the proposed transducers or disturbances and specifics for implementation of the system are not disclosed.

Accordingly, the primary object of this invention is to provide an inexpensive shock resistance mechanism for the HDA that provides the head-positioning coil with the necessary signal to resist large or small, internal or external, rotational or linear accelerations, and thereby (1) increase the speed of the input/output operation even when the system is subject to such accelerations, (2) minimize the possibility of input/output error when the system is subject to such accelerations, (3) maintain stability of the servo circuitry, and (4) provide for the possibility of using softer shockmounts that better protect the HDA against potential damage by relatively large external shocks.

SUMMARY OF THE INVENTION

A shock resistant hard disk drive system in accordance with one exemplary embodiment of the present invention includes, among other elements, a plurality of magnetic disks for recording data, a plurality of magnetic heads for performing input/output operation on the magnetic disks, with at least one of the magnetic heads being used as a servo head, a head-positioning mechanism for controlling the movement of the magnetic heads, a servo control mechanism or servo loop which detects movement of the head positioning mechanism "off-track", and opposes shifts in the location of the servo head, phase locked loop means including a voltage controlled oscillator, and circuitry for applying a control voltage to control the frequency of the oscillator in accordance with pulses read from said magnetic disk, and filtering means for filtering the control voltage and for providing the resulting signal to the head-positioning mechanism.

As described in the background of the invention the servo circuitry is inherently limited in its capability to provide the necessary signal to counter the effect of certain accelerations. For example, a servo loop in a disk drive system using a head positioning assembly that rotates about its axis is not capable of totally counteracting the effect of large rotational accelerations. Such accelerations normally cause a significant delay or error in the input-output operation of the HDA. To counteract such accelerations, the gain of the servo loop needs to be significantly increased. However, such an increase in the gain tends to drive the servo loop into an unstable state.

To avoid this limitation, a phase comparator circuit that is normally external to the operation of the servo loop, is employed to detect such accelerations applied to the HDA and to inject the necessary signal into the servo loop to counteract the effect of such accelerations. The advantage of employing such comparator means is the elimination of the need to increase the stiffness of the servo loop, thereby avoiding instability in the servo loop. Because the comparator means provides the signal necessary to resist certain accelerations that the servo loop was otherwise incapable of countering, the resistance of the HDA system to such accelerations is effectively increased without increasing the stiffness of the servo loop.

In accordance with another embodiment of the present invention, a shock resistant hard disk drive system includes, among other elements, a plurality of magnetic heads for performing input/output operation on the magnetic disks, with at least one of the magnetic heads being used as a servo head, a head-positioning mechanism for controlling the movement of the magnetic heads, a servo control mechanism or servo loop for opposing shifts in the location of the servo head, detecting means for detecting and measuring certain accelerations applied to the system, and filtering means for filtering the output of said detecting means and for providing the signal to the head-positioning mechanism.

Generally, the detecting means involves a mechanism for measuring motion or acceleration, in the same way that an accelerometer measures such motions. An example of such a mechanism is a phase locked loop employed to synchronize the HDA clock signal with certain servo pulses which constitutes a velocity transducer from which the HDA acceleration can be derived.

Basically, a servo loop includes means for (1) detecting the position of the servo head, (2) generating the signal necessary to compensate for potential shifts in the position of the servo head, and (3) amplifying this signal and applying the signal to the head-positioning magnetic coil. The servo loop includes a head-positioning coil, demodulator, compensator, filter, power amplifier, and a phase lock loop. The demodulator uses the servo pulses read by the servo-head to decode the instantaneous position of the servo-head. The demodulator produces the so called position error signal for compensating for the offsets in the position of the magnetic head. The compensator shifts the phase and changes the amplitude of the position error signal over a range of frequencies to provide stability in the servo loop. The output of the compensator passes through a filter that filters out the noise signals produced by the mechanical or electrical components of the system. The output of the filter is then fed into a power amplifier that amplifies the signal. The amplified signal is the input to the head-positioning magnetic coil that generates an acceleration in accordance with the signal. Generally, this acceleration is produced to counter the effect of the accelerations applied to the system. However, due to its inherent limitations, as described above, the servo loop is not capable of producing signals to immediately counter the effect of certain accelerations applied to the system. Incidentally, the signal necessary to resist such accelerations is produced by the phase locked loop (PLL) already employed in the servo loop.

The function of the phase locked loop (PLL) is to change the oscillation period of the voltage controlled oscillator (clock or VCO) in accordance with the servo pulses read by the servo-head. Generally, the PLL includes a phase comparator that detects and measures the phase difference between the VCO signal and certain servo pulses, as described below.

As mentioned in the background of the invention, the servo pulses are recorded on at least one disk. These pulses include certain "synchronization" pulses and pulses that indicate the relative position of the head with respect to the adjacent tracks. These pulses are recorded on the disk surface at a certain distance from each other. The servo head reads these pulses and outputs them to the phase comparator. Normally, the phase comparator measures the phase difference between the synchronization pulses and a certain modulus (modulus being every other one, two, or Nth clock signal) of the VCO signal. The phase comparator then generates a speed up or a slow down signal depending on whether the servo pulse leads or lags the VCO pulse, respectively. The output of the phase comparator is then input to a loop compensator that sums up these signals and produces a control voltage signal for input to the VCO. The VCO then changes the frequency of its oscillation according to this input signal. As a result, the VCO signal and the synchronization signal become synchronous again. Incidentally, the VCO control voltage includes a signal which is related to that which is necessary for countering the effect of certain accelerations that the servo loop itself is not capable of adequately producing.

In accordance with one exemplary embodiment of the present invention, the VCO control voltage is employed for input to the servo loop, or the head-positioning mechanism. The VCO control signal, being proportional to the relative speed of the heads and the disks, effectively acts as a velocity transducer. More specifically, the phase comparator measures the rotational velocity resulting from accelerations applied to the disk or to the magnetic coil or to both. A rotational acceleration causes an apparent acceleration of the disks relative to the heads, as well as causing angular acceleration of the head positioning coil. The magnetic head senses the resulting rotational velocity because of the instantaneous changes in the disk rotational speed as seen by the head. This sensed change in speed of the disk causes a frequency modulation (FM) of the servo pulses read from the disk. FM is detected by the PLL, which is a preexisting component of the servo detection circuitry. More specifically, phase modulation is sensed by phase comparator, which generates a slow down or speed up signal in accordance with the FM signal. The output of the comparator is integrated by an integrator. The output of integrator includes the necessary signal for head-positioning coil to resist the acceleration that caused the signal to be produced. The output of the phase comparator/integrator is separately differentiated to produce an acceleration signal.

Thus, the phase lock loop effectively measures the acceleration applied to both the disks and to the head-positioning assembly including the coil and produces a signal in accordance with such accelerations. The present invention employs this signal, with appropriate signal conditioning, and inputs it to the servo loop where it is fed into the head positioning magnetic coil. Accordingly, the magnetic coil resists such accelerations without the need for further stiffening of the servo loop. However, the VCO control voltage is preferably conditioned before being input to the servo loop.

In accordance with one specific embodiment of the present invention, the VCO control voltage is input to a lowpass filter that filters out the high frequency signals. The output of this filter is then differentiated. This differentiation is desirable because the VCO control voltage is proportional to relative velocity between the head and the recording medium and is not appropriate for input to the power amplifier, which, since it produces acceleration, should receive acceleration signals as input. Differentiating the velocity signal produces the desired acceleration signal. The output of the differentiator then passes through a bandpass filter having a bandwidth centered around the natural frequency of the HDA, including its shock mounts. The output of the bandpass filter is then fed into the servo loop where it is amplified and applied to the head positioning magnetic coil.

Accordingly, as described above, the invention has achieved our goals of resisting large or small, internal or external, rotational accelerations, and has (1) maintained through-put of the input/output operation when the accelerations, by avoiding delays resulting from undesired head displacement, (2) minimized the possibility of input/output error when the system is subject to such accelerations, (3) maintained stability of the servo circuitry, and (4) provided for the possibility of using softer shock-mounts that better protect the HDA against potential damage by relatively large external shocks.

It is to be understood that the above describes only one embodiment of the present invention. The present invention may be implemented using any means that measures the shock or vibration applied to the system, and provides the appropriate signal to the head-positioning magnetic coil, or a similar device, to resist the effect of such shock or vibration.

In accordance with the specific implementation of the invention, as described above, the invention has the advantage of employing currently existing circuitry for generating the appropriate signal in response to such accelerations. This implementation therefore avoids the need for adding other arrangements for the measurement of such accelerations. Further, the above specified implementation involves a head positioning magnetic coil that has a rotational axis and responds to rotational accelerations.

Similarly, the invention may be implemented to generate the necessary signal through the use of circuitry measuring the interval between regular indications recorded on the media, and converting this data into acceleration signals. It is also noted that the present invention is applicable to floppy disk and to optical disk storage systems, as well as to hard disk drives. Further, the filtering stage described above may be implemented in other appropriate ways to filter out undesired signals.

These and other objects, advantages, and features of the present invention will become apparent with the following detailed description.

DETAILED DESCRIPTION

Figure 1:
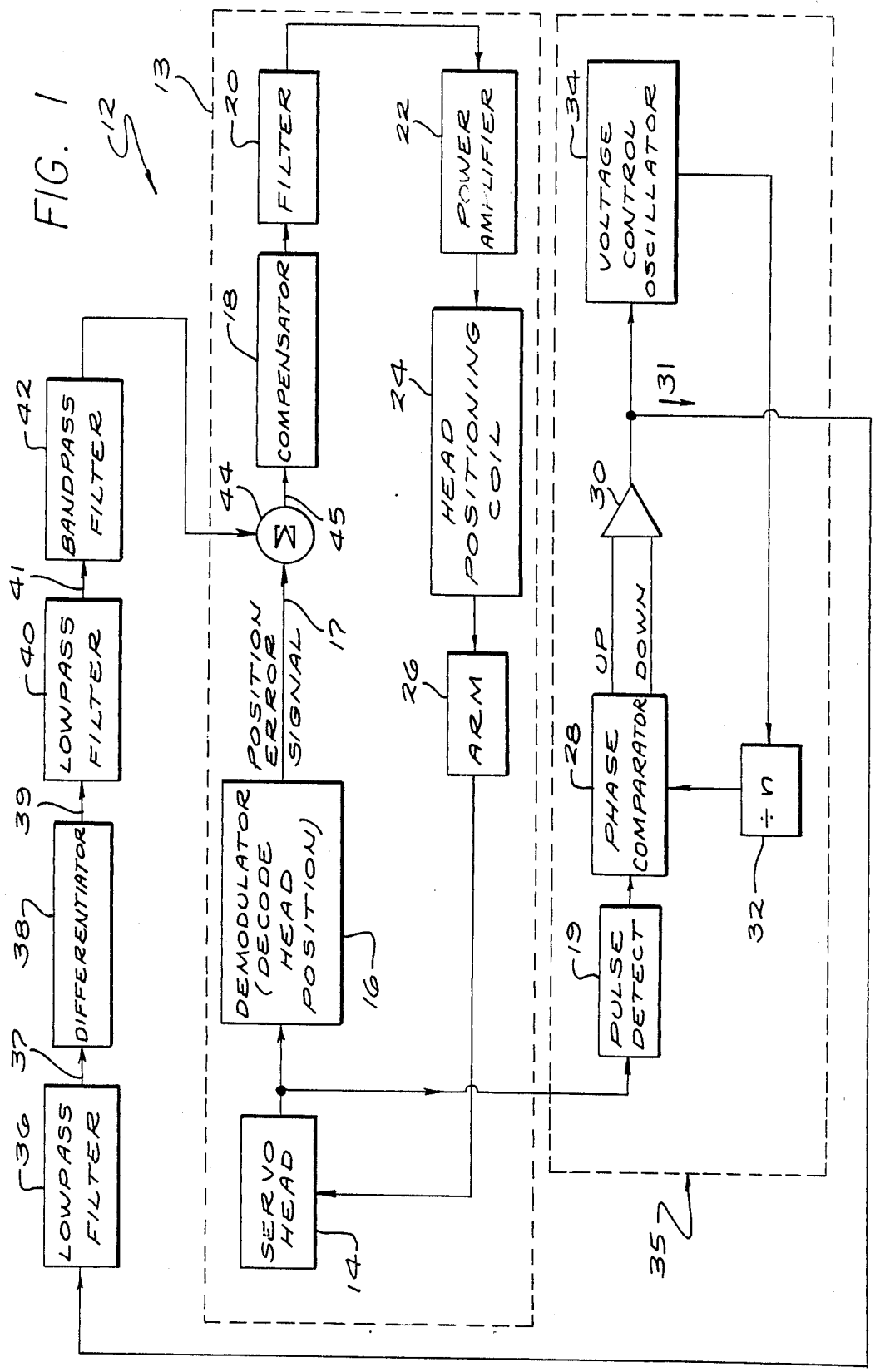
FIG. 1 is a block diagram of the major components of a shock resistant disk drive, illustrating the principles of the invention.

Referring more particularly to the drawings, FIG. 1 is a block diagram showing the major components of a shock resistant disk drive 12, and illustrating the principles of the invention. As shown, servo loop 13 includes, a servo head 14 for reading servo pulses from the corresponding disk, a demodulator 16, a signal adder 44, a compensator 18, a filter 20, a power amplifier 22, a head-positioning coil 24, and an arm 26 mechanically coupling the servo head 14 to the head positioning coil 24. Normally, servo head 14 reads the servo pulses from its corresponding disk, and provides its output to demodulator 16 and pulse detector 18. Demodulator 16 uses the output of servo head 14 to decode the position of the head. If servo head 14 is off track, demodulator 16 generates the appropriate signal, referred to as the position error signal, to compensate for this offset.

The compensator 18 changes the phase and amplitude of the output of demodulator 16 over a range of frequencies. This phase shift provides the system with stability. Filter 20 filters out the noise produced by the mechanical or electrical components of the system. Filter 20 is a notch filter which attenuates frequencies in the range close to the natural resonance frequency of the hard disk assembly. Power amplifier 22 amplifies the output of filter 20 and feeds it into head positioning coil 24. The magnitude of amplification by amplifier 22 is limited because too much amplification drives the system into an unstable phase. As a result, servo loop 13 is limited in its loop gain. The loop gain which is determined by the magnitude of amplification by amplifier 22 is also referred to as the stiffness of the loop. The term stiffness refers to the resistance of the loop to accelerations applied to the system. The stiffer the loop, the better its capability to cope with larger accelerations. However, if the gain is increased beyond a predetermined limit, the servo loop will become unstable. Therefore, the servo loop is limited in its capability in coping with certain accelerations applied to the system.

The output of the amplifier 22 is fed as a current to the head positioning coil 24. Coil 24 reacts according to the signal and applies an acceleration to the head positioning assembly including the arm 26 to move the head 14 to its proper location. Unfortunately, and as explained above, servo loop 13 is not capable of properly countering large rotational accelerations applied to the system. As a result, the input/output operation of the system is delayed when such accelerations are applied to the system, and the throughput of the system is significantly reduced. To provide the necessary signal to counter such rotational accelerations, the current invention employs a method of detecting, measuring and using such accelerations. In accordance with a preferred embodiment of the present invention, such a method is implemented using the preexisting phase locked loop 35.

Phase locked loop 35 normally uses the output of servo head 14 to generate the appropriate signal for controlling the frequency of voltage control oscillator 34. More specifically, servo head 14 reads servo pulses from its corresponding disk and generates an analog signal corresponding to the recorded pulses. Normally, servo pulses include synchronization pulses used for synchronizing the VCO. These analog signals are then used by pulse detector 19 to detect the appropriate servo pulses, including the synchronization pulses. Phase comparator 28 compares the phase of the synchronization pulse with that of a "VCO signal modulus n" (n being a positive number; "VCO signal modulus n" means that the comparator 28 will compare the phase of a synchronization signal with that of the nth VCO signal). The comparator 28 then generates a "speed up" or "slow down" signal depending on whether the synchronization signal leads or lags the VCO signal. These speed up or slow down signals are then summed by adder 30. VCO 34 uses the output of adder 30 to increase or decrease the frequency of the oscillator. The following describes how the comparator responds to such rotational accelerations.

Figure 4:
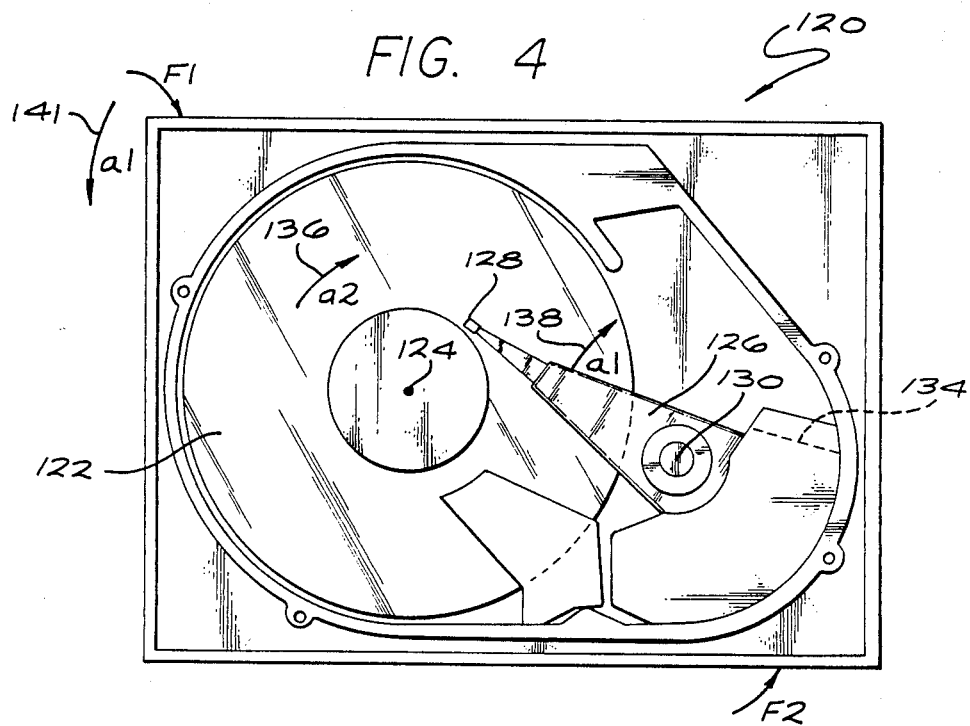
FIG. 4 is a top view of an unsealed disk drive, showing the disks, the head-positioning assembly, and the associated arm supporting the magnetic head.

When a rotational acceleration is applied to the Winchester disk system, the acceleration affects two different aspects of the system in different manners, as best seen in FIG. 4. One of these aspects involves the relative circumferential shifting of the head 128 with respect to the disks 122, and the other involves the radial (off-track) displacement of the heads including head 128 with respect to the disks 122, as a result of the rotational acceleration applied to the head positioner including coil 124 and arm 126. As discussed in detail below, the first of these phenomena provides an acceleration measurement signal which is modified and applied to the head positioning coil 124 to hold the heads on track.

Now, considering specifically how this is accomplished, it may be noted that the absolute speed of the disks changes very little because of their large inertia. Since the absolute speed of the disks is essentially constant and the head 14 moves circumferentially with respect to the disk, the relative speed of the disk as seen by the head appears to change. The disk appears to speed up or slow down as seen by head 14 because head 14 rotates around the disk during a rotation of the HDA. This sensed change in speed of the disk causes a frequency modulation (FM) of the servo pulses read from the disk. This Frequency Modulation is detected by phase-locked loop 35, which is a preexisting component of the servo detection circuitry. More specifically, FM is sensed by phase comparator 28, which generates a slow down or speed up signal in accordance with the FM signal. The output of comparator 28 is processed by the circuit 30 to provide the VCO input signal which includes the necessary signal 31 for head positioning coil 24 to resist the acceleration that caused the signal 31 to be produced. However, signal 31 must pass through a series of circuits 36, 38, 40, and 42 before it is fed into servo loop 13. Normally, signal 31 includes high frequency noise produced by VCO 34, and low frequency noise produced by electrical and mechanical components of the disk spindle motor.

Lowpass filter 36 filters out the high frequency noise that is normally present in signal 31. Signal 37, which is the output of filter 36, is a velocity signal, and must be transformed into an acceleration signal for use by the servo loop. This transformation is done by differentiator 38 that differentiates signal 37 and produces an acceleration signal 39. Lowpass filter 40 screens the high frequency noise out of signal 39 to produce signal 41. Bandpass filter 42, which has a bandwidth centered around the natural frequency of the HDA and the shock mount assembly, only passes signals in this bandwidth to adder 44. In one particular case, the calculated natural frequency of the HDA and its shock mounts was approximately 100 Hertz. Adder 44 sums the signal 17 produced by demodulator 16 with signal 43, and passes signal 45 to compensator 18. Signal 45 then is applied through servo loop 13 to provide coil 24 with the necessary signal to resist any internal or external rotational accelerations, as discussed above.

Figure 2:
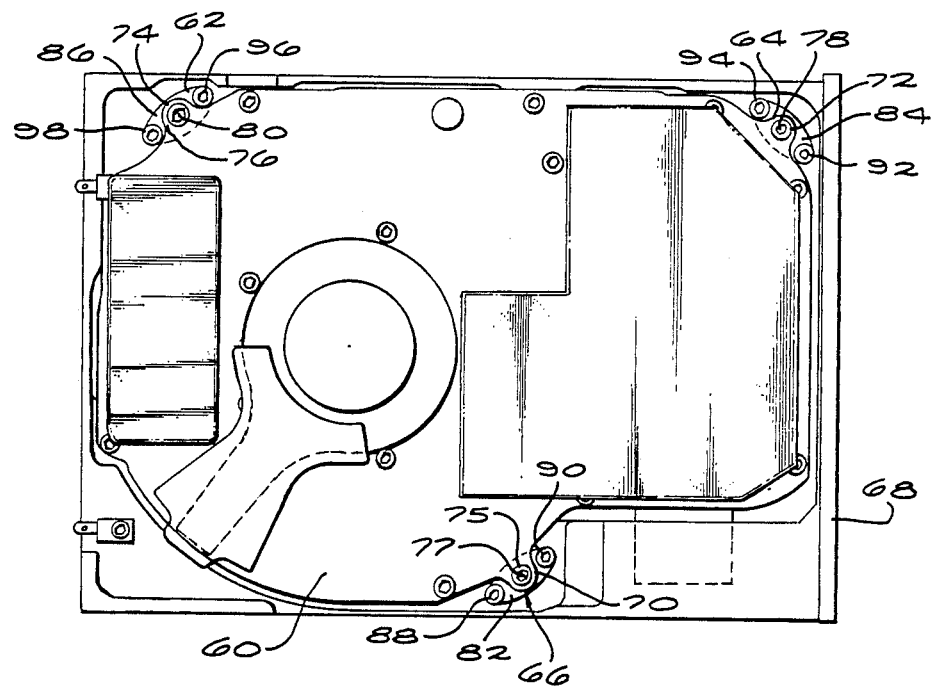
FIG. 2 is a bottom view of a sealed Hard Disk Assembly (HDA), showing the shock mounts, and the frame.

FIG. 2 is a bottom view of a sealed Hard Disk Assembly (HDA) 60, showing the shock mounts 62, 64, and 66, and the frame 68. HDA 60 does not physically contact frame 68 except through shock mounts 62, 64, and 66. HDA 60 includes three protrusions 70, 72, and 74, used for mounting shock mounts 66, 64, and 62, respectively, on HDA 60. More specifically, screw 76, and another screw not shown, mount HDA 60 on shock mount 66. Similarly, HDA 60 is mounted on shock mounts 64, and 62, using screws 78, and 80, respectively, and two other screws not shown. These shock mounts are mounted on frame 68 using oval shaped plates 82, 84, and 86, and screws 88, 90, 92, 94, 96, and 98.

Figure 3:
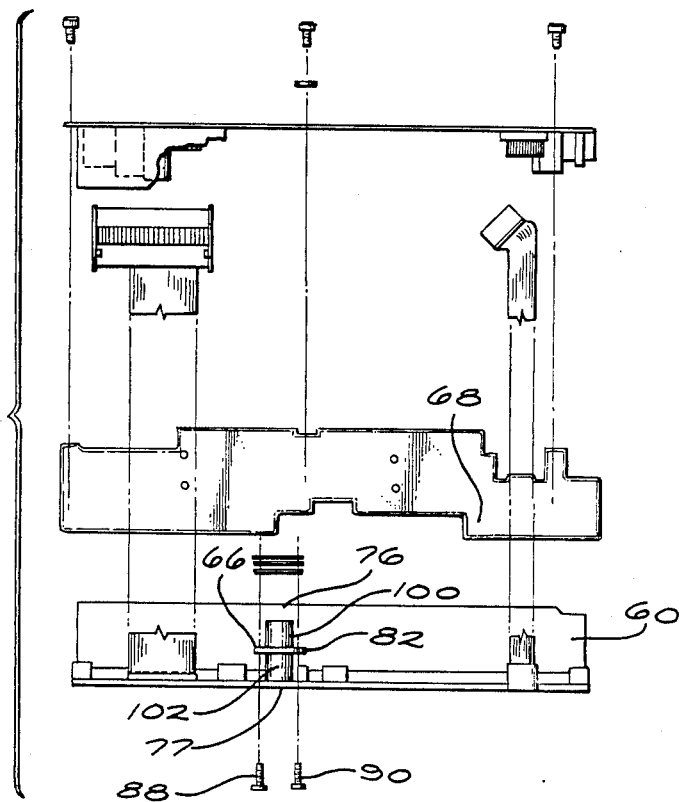
FIG. 3 is an exploded side view of the HDA system FIG. 2.

FIG. 3, which is an exploded side view of the HDA system of FIG. 2, shows more clearly how the HDA 60 is mounted on the shock mounts including mount 66. As shown in FIG. 3, shock mount 66 includes two cylindrical rubber pieces 100 and 102, which are positioned at the opposite sides of oval shaped plate 82. The other side of rubber pieces 100, and 102, and threaded metal inserts as shown at reference numeral 75 in FIG. 6, which are not adjacent oval shaped plate 82, are used to mount HDA 60 on shock mount 66. Screw 76 (not shown) fastens HDA 60 to rubber piece 100, and screw 77, not shown, fastens HDA 60 to rubber piece 102. Similarly, HDA 60 is mounted on shock mounts 64 and 62 using screw pairs, including screws 78 and 80, respectively. With the exception of its contacts, as described above, with shock mounts 66, 64, and 62, HDA 60 has no other physical contacts with any other mechanical parts or bodies. The shock mounts have effectively insulated the HDA from having any direct physical contacts with bodies foreign to the HDA.

The shock mounts are also used for mounting HDA 60 on frame 68. As shown in FIGS. 2 and 3, screws 88 and 90 mount the oval shaped plate 82 onto protrusions (not shown) coming out of frame 68. Similarly, shock mounts 64 and 62 are mounted on frame 68 using two screws 92 and 94, and 96 and 98, respectively, through their respective plates 84 and 86. With this arrangement of shock mounts, frame, and HDA, the HDA 60 is effectively suspended on the shock mounts that are supported by frame 68. As a result of this arrangement, the shock mounts insulate the HDA from outside forced or shocks applied to frame 68.

Figure 5:
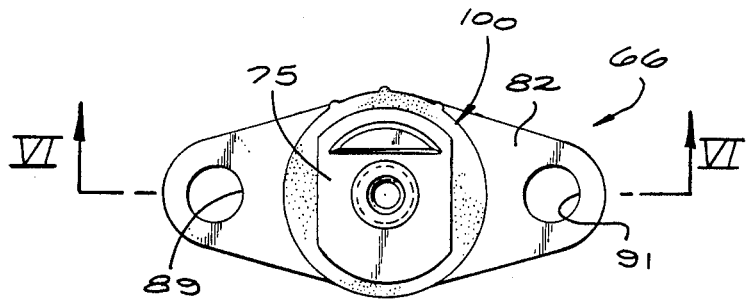
FIG. 5 is a top view of a shock mount.
Figure 6:
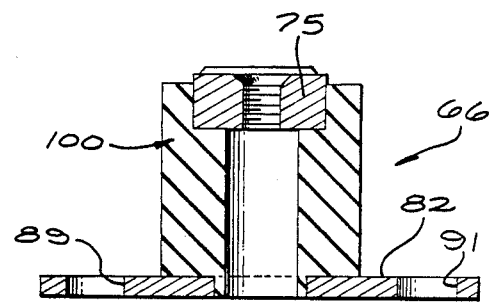
FIG. 6 is a side view of the shock mount of FIG. 5.

A closer look at the structural configuration of the shock mounts, as shown in FIG. 5 and 6, better clarifies the manner in which the mounts are interconnected with the HDA and frame. 5. FIG. 5 is a top view of shock mount 66, showing the rubber piece 100, and plate 82. As shown in FIG. 5, insert 75 having a central screw hole provides the capability of mounting HDA 60 using screw 76 (as shown in FIG. 3) onto shock mount 66. Further, holes 81 and 91 provide for the capability of mounting shock mount 66 using screws 88 and 90 on the frame 68. The holes 89 and 91 are more clearly shown in FIG. 6, which is a side view of shock mount 66 of FIG. 3. Even though the shock mounts protect the HDA against shocks applied to frame 68, the HDA 60 is still subject to vibrations produced by such shocks. Such vibrations in turn cause the disks as well as the magnetic coil to accelerate about their axis according to the force of the shock exerted on the system.

FIG. 4, which is a top view of an exposed HDA system, is useful in showing how an internal or external acceleration applied to the HDA system produces a reaction in the disks as well as in the head-positioning assembly, including the coil 134 and the arms including arm 126 associated with it. FIG. 4 shows the disks 122, disk axis 124, coil 134, arm 126, magnetic head 128, and the axis 130 of the head positioner to which arm 126 is secured. To show how the system reacts to a rotational acceleration, the hypothetical forces F1 and F2 are shown to be exerted on the HDA system 120. In reaction to such rotational acceleration, system 120 tends to rotate, with a rotational acceleration at, in the direction of arrow 141, as shown in FIG. 4. In response to this reaction of system 120 to such rotational acceleration, the arm will tend to rotate about the axis 130 in the direction 138, with an acceleration a1, and will thus have a tendency to shift "off-track" in the radial direction as viewed from the disk axis 124. Similarly, disks 122 will have an effective relative rotation with respect to head 128, about their axis 124 in the direction 136, with an acceleration a2. Acceleration a2, which has the direction 136, causes an instantaneous change in the relative rotational speed of disk 122, as seen by servo head 128. The sensed change in rotational speed of disk 122 causes a frequency modulation of the servo pulses read from the disk 122. As discussed above in association with FIG. 1, this frequency modulation is detected by the phase comparator 28 of FIG. 1 which in turn produces and feeds an appropriate signal into servo loop 13 to resist the rotational acceleration. As discussed above, the primary object of this invention is to provide for a signal, in response to rotational accelerations applied to the HDA system, to help keep the magnetic heads on track. As discussed above in connection with FIG. 1, which shows an exemplary embodiment of the present invention, the present invention has successfully achieved the goal of improving system throughput, without adding much to the complexity or cost of the circuit.

Figure 7:
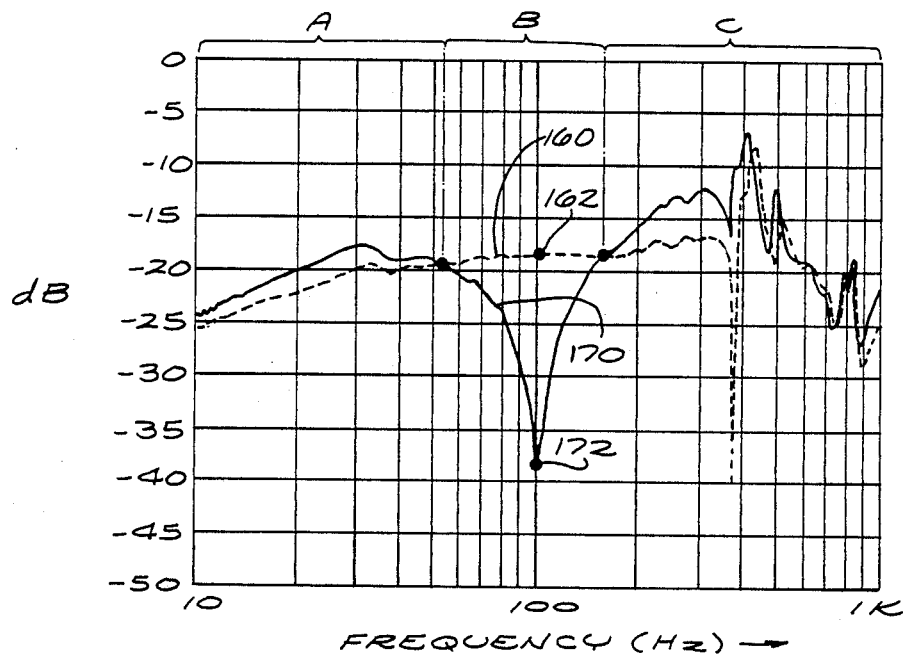
FIG. 7 graphically illustrates a dashed curve which shows the ratio of the amplitude of the movement of the head to the amplitude of the vibration of the HDA, this ratio being an indication of the error in the position of the head when the present invention is not employed, and a solid curve which shows how this error is significantly attenuated near the 100 Hertz range, which is the natural frequency of the HDA, the shock mounts not being employed for either measurement.
Figure 8:
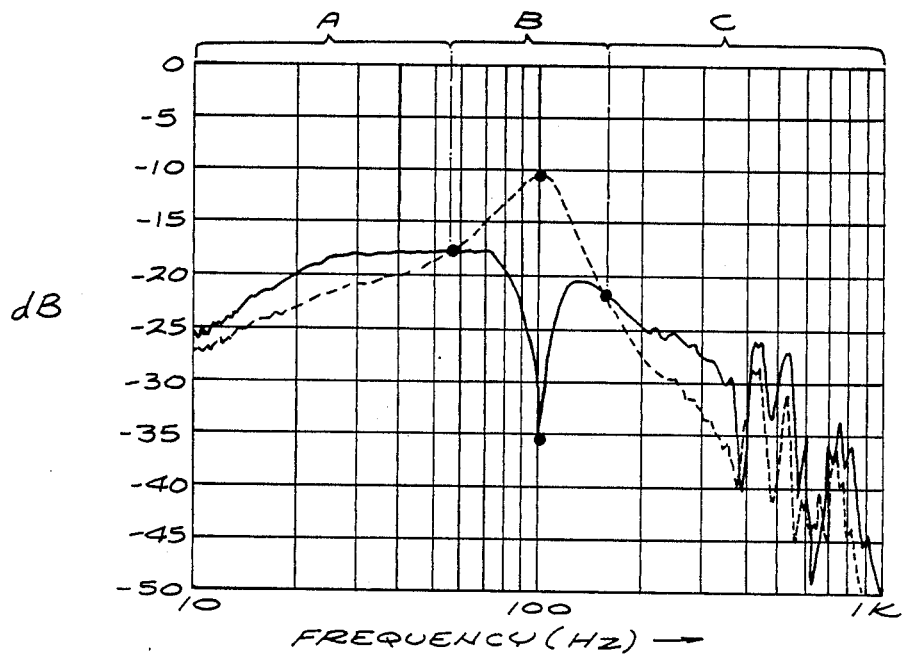
FIG. 8 graphically illustrates a dashed curve which shows the ratio of the amplitude of the movement of the head to the amplitude of the vibration of the HDA, this ratio being an indication of the error in the position of the head when the present invention is not employed, and a solid curve which shows how this error is significantly attenuated near the 100 Hertz range, which is the natural frequency of the HDA, the shock mounts being employed for both measurements, which explains the reason for the reduced position error in the high frequency range.

FIG. 7 and 8 illustrate graphically the significant reduction in the displacement of magnetic heads when the system is subject to various accelerations.

FIG. 7 graphically illustrates a dashed curve 160 and a solid curve 170, each showing, under different settings, the ratio of the amplitude of the movement of the head to the amplitude of the vibration of the HDA. This ratio indicates the error in the position of the head. The higher the ratio, the larger is the error in the position of the magnetic heads. The curves in FIGS. 7 and 8 must be analyzed according to three different ranges of frequencies, labelled as regions A, B, and C in both figures. Region A is the low frequency range. Region B represents a narrow bandwidth centered around the resonant frequency of the HDA system. In this particular case the resonant frequency is approximately 100 Hertz. Finally, region C is the high frequency range.

The dashed and solid curves of FIG. 7 are similar to those of FIG. 8 with the exception that the curves of FIG. 7 are measured without any shock mounts installed, while the curves of FIG. 8 are system responses with shock mounts properly in place. Further, in both figures, the dashed curve is the response of a system that lacks the benefits of the present invention, where the solid curve illustrates the significantly improved response of the same system when the present invention is employed. Referring more particularly to FIG. 7, region A illustrates that the dashed and solid curves are similar in the low frequency range. The reason for this similarity is that at low frequencies the HDA and its components will move in phase with the source of the acceleration. This situation is analytically similar to the motion of an automobile at slow speed over a convex surface, such as a road bump. The automobile and all components associated with it will move up the bump and then down the bump, without creating a motion in one part relative to another part of the automobile. Similarly, when the acceleration source exerts its acceleration on the HDA system, the whole HDA system including the disks and the heads tend to move with it. As a result, the relative speed of the head with respect to the disks remains constant. Therefore, in the low frequency range there is no need to provide an external signal to compensate for any potential instantaneous changes in speed of the head relative to the disks. In contrast to region A, region B illustrates a significant difference between the solid curve 170 and dashed curve 160.

As shown in FIG. 7, solid curve 170 has sharply decreased in its dB value in region B. Region B represents a frequency band centered around the resonant frequency of the HDA system. An acceleration that causes the HDA system to vibrate at or near its resonant frequency will also cause the largest errors in the position of the servo head (see dashed curve in FIG. 8). As shown in FIG. 7, there is approximately a 20 dB difference between the position error point 162 on the dashed curve 160 and point 172 on the solid curve 170. Finally, at the high frequency region C of FIG. 7 the curves 160 and 170 tend to be similar again. As shown, the present invention is not directed to compensating for position errors in this region, as the shock mounts are fully capable of coping with such accelerations, as shown in region C of FIG. 8.

FIG. 8 graphically illustrates the same two curves, with the exception that for the purposes of FIG. 8 the shock mounts were employed. As shown, in FIGS. 7 and 8, the curves behave similarly for regions A and B, but not for region C. This similarity in the A and B regions is due to the fact that the shock mounts aren't too effective in the low and mid frequency range, as discussed above. In fact, in the resonant frequency range B the shock mounts are counter productive because they tend to resonate and increase the amplitude of the HDA motion. However, in region C, the shock mounts significantly attenuate the position error, as shown in FIG. 8. Therefore, the only region that needs position error compensation is the region B. As a result, and as shown in FIG. 1, bandpass filter 42 is employed to allow only the signals in the resonant frequency range to pass to the servo loop. This bandpass filter, along with the other filters discussed in connection with FIG. 1, are schematically shown in FIGS. 9 and 10.

Figure 9:
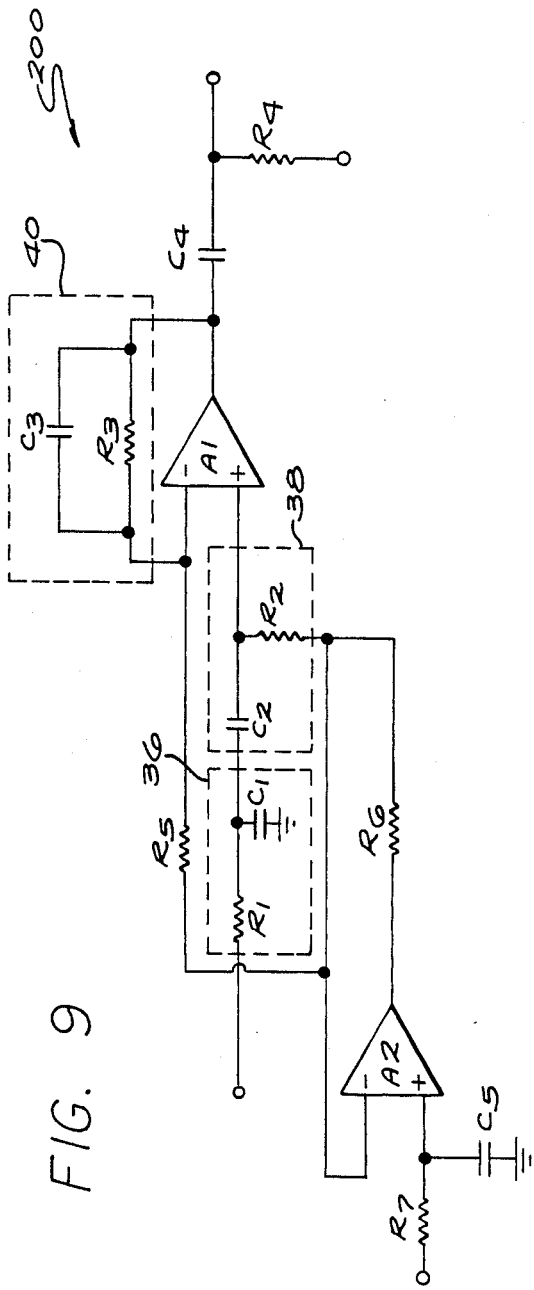
FIG. 9 is a schematic diagram of the low pass filters and differentiator employed in an exemplary embodiment of the present invention.

FIG. 9 is a schematic circuit diagram 200 of the low pass filters 36, and 40, and the differentiator 38 employed in the exemplary embodiment of the present invention, as shown in FIG. 1.

Figure 10:
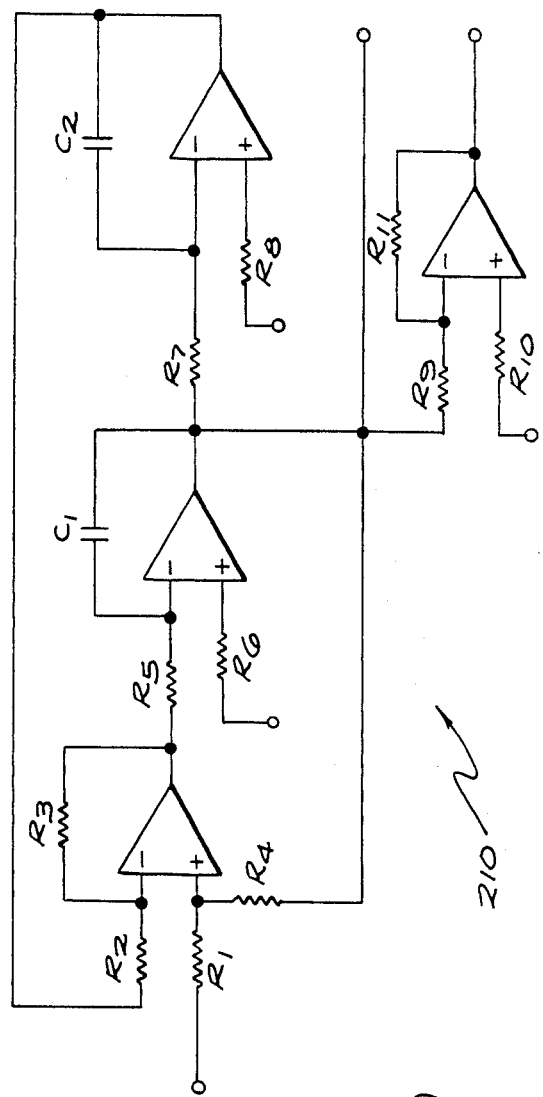
FIG. 10 is a schematic diagram of a bandpass filter employed in one exemplary embodiment of the present invention.

Finally, FIG. 10 is a circuit diagram 210 of bandpass filter 42 employed in one exemplary embodiment of the present invention, as shown in FIG. 1.

It is noted in passing that the invention could be implemented using floppy disks or optical disks, as well as hard disk drive storage systems. Also, any technique for measuring the angular velocity or acceleration of the reading device relative to the storage medium could be employed to obtain the storage medium could be employed to obtain the correction signal to be applied to the positioning coil. Further, the filtering means may include various combinations of lowpass, highpass and bandpass filters. The output of the detecting means may be input to the head-positioning coil, or be input to the servo loop. The head positioning mechanism could be a coil or other appropriate devices. The detecting means may measure the rotational accelerations or linear accelerations depending on the need of the system. The head-positioning mechanism may rotate about an axis or may move along a straight line or a curve; and in geometries where the head positioner is not pivotally mounted and counterbalanced, compensation for linear shocks and vibration may also be provided. The HDA system may use three, more than three, or less than three shock mounts. The shock mounts may be made of rubber or other shock absorbing material. Accordingly, the present invention is not limited to the configuration precisely as shown in the drawings and as described in detail hereinabove.

What is claimed is:

1. A shock resistant hard disk drive storage system comprising:
    a plurality of magnetic disks;
    a plurality of magnetic heads for performing input and output operations on said magnetic disks;
    at least one of said magnetic heads being a servo head;
    a head positioning assembly supporting said magnetic heads;
    at least one of said magnetic disks including servo pulse signals encoded thereon;
    servo control circuitry for opposing shifts in the location of said servo head;
    phase-locked loop means including a voltage controlled oscillator, and comparator circuit means for applying a control voltage to control the frequency of said oscillator in accordance with pulses read from said magnetic disk by said servo head; and
    signal processing means for filtering and differentiating said control voltage, and for feeding it into said servo control circuitry;
    an output of said phase-locked loop means indicates angular acceleration of said disks as sensed by said servo head, and is employed to counteract the effect of the same angular acceleration on said head positioner assembly.

2. A system as defined in claim 1 wherein said comparator means includes integrator means for integrating the output of said comparator means.

3. A system as defined in claim 1 wherein said comparator means measures internal or external rotational accelerations.

4. A system as defined in claim 1 wherein said signal processing means comprises a low pass filter for filtering out undesirable high frequency signals.

5. A system as defined in claim 1 wherein said signal processing means comprises a differentiator for differentiating the filtered control voltage.

6. A system as defined in claim 1 wherein said signal processing means comprises a band pass filter for passing through to said servo control circuitry only the frequencies in the region of the resonant frequency of said hard disk drive system.

7. A hard disk drive storage system including shock compensation circuitry comprising:
   a hard disk drive including a magnetic head positioner; said hard disk drive including a plurality of magnetic disks mounted for rotation about a predetermined axis and means for mounting said head positioner for rotation about a second axis which is substantially parallel to said predetermined axis;
   phase lock loop means including a voltage controlled oscillator and means for applying a control voltage to control the frequency of the oscillator in accordance with digital signals read from magnetic heads coupled to the hard disks;
   said hard disk drive being supported on resilient mountings having a predetermined resonant frequency; and
   means for applying a positioning signal to said head positioner in accordance with a function of said control voltage to oppose shifts in the location of said head positioner which would otherwise occur as the result of shocks or applied acceleration.

8. A system as defined in claim 7 further comprising filtering means for filtering said control voltage.

9. A system as defined in claim 8 wherein said filtering means comprises a low pass filter for filtering out undesirable high frequency signals.

10. A system as defined in claim 7 including a differentiator for differentiating said control voltage.

11. A system as defined in claim 8 wherein said filtering means comprises a band pass filter for filtering out undesirable low and high frequencies from said control voltage.

12. A shock resistant disk drive storage system comprising:
   at least one magnetic disk mounted to rotate about a predetermined axis;
   at least one magnetic head coupled to said magnetic disk;
   at least one of said magnetic disks including regularly spaced pulses;
   at least one of said magnetic heads being a servo head mounted to read said regularly spaced pulses;
   head-positioning means for controlling the movement of the magnetic heads;
   means for mounting said head positioning means for rotation about a second axis which is substantially parallel to said predetermined axis;
   means for detecting and measuring accelerations applied to said system as a function of the signals received by said servo head, and for producing an appropriate signal corresponding to such acceleration and for applying said signal to said head positioning means to resist such accelerations.

13. A system as defined in claim 12 wherein said detecting means measures internal or external rotational accelerations.

14. A system as defined in claim 12 wherein said detecting means includes an accelerometer for detecting and measuring the accelerations applied to said system.

15. A system as defined in claim 12 further comprising filtering means for filtering the output of said detecting means.

16. A system as defined in claim 15 wherein said filtering means comprises a low pass filter for filtering out undesirable high frequency signals.

17. A system as defined in claim 12 including a differentiator for differentiating the output signal of said detecting means.

18. A system as defined in claim 15 wherein said filtering means comprises a band pass filter for filtering out undesirable low and high frequency signals.

19. A system as defined in claim 12 further comprising:
   phase-locked loop means including a voltage controlled oscillator and comparator means for applying a controlled voltage to control the frequency of the oscillator in accordance with servo pulses read from said magnetic disk including servo pulses;
   said detecting means utilizing the input to said voltage controlled oscillator for input to said head-positioning means for enabling said head-positioning means to oppose shifts in the location of said servo head.

20. A system as defined in claim 19 wherein said disk drive system includes integrator means for integrating the output of said comparator means.

21. A shock resistant disk drive storage system comprising:
   at least one storage disk mounted to rotate about a predetermined axis;
   at least one reading head coupled to said storage disk;
   at least one of said storage disks including regularly spaced pulses;
   at least one of said heads being a servo head mounted to read said regularly spaced pulses;
   head-positioning means for controlling the movement of the reading head, said head positioning means being mounted for rotary movement about a second axis which is substantially parallel to said predetermined axis; and
   means for detecting and measuring accelerations applied to said system as a function of the signals received by said servo head, and for producing an appropriate signal corresponding to such acceleration and for applying said signal to said head positioning means to resist such accelerations.

* * * * *